United States Patent
Frost et al.

[15] 3,691,524
[45] Sept. 12, 1972

[54] TIRE INFLATION MONITORING SYSTEM

[72] Inventors: Harold A. Frost, Durham, N.C.; Melvin R. Simpson, Chardon, Ohio

[73] Assignee: Eaton Yale & Towne, Inc., Cleveland, Ohio

[22] Filed: June 15, 1970

[21] Appl. No.: 45,954

[52] U.S. Cl. ..................340/58, 340/263, 307/123, 180/103, 180/82, 73/146.5, 324/78 R, 324/78 D, 324/160, 324/161, 324/163, 324/166
[51] Int. Cl. ..............................................B60c 23/00
[58] Field of Search ..340/58, 263, 27; 324/160, 161, 324/163, 166, 78 R, 78 D; 307/123; 180/82, 103; 303/21 A, 21 CE; 73/146.2, 146.3, 146.4, 146.5

[56] References Cited

UNITED STATES PATENTS

| 2,954,520 | 9/1960 | Barany | 324/161 X |
| 3,130,805 | 4/1964 | Carter et al. | 340/58 UX |
| 3,348,143 | 10/1967 | Young | 324/166 |
| 3,374,460 | 3/1968 | Massoubre | 340/58 X |
| 3,524,103 | 8/1970 | McCune | 324/161 |
| 3,581,277 | 5/1971 | Beatty et al. | 340/58 |
| 3,613,075 | 10/1971 | Griffiths et al. | 340/58 |

Primary Examiner—John W. Caldwell
Assistant Examiner—William M. Wannisky
Attorney—Yount and Tarolli

[57] ABSTRACT

An improved tire inflation monitoring system monitors the angular movement of the wheels of a vehicle by counting the revolutions on each of the wheels and comparing the count with a count from another wheel to determine whether or not each wheel has the proper diameter. The monitoring system includes an indicating means for signaling an occupant of the vehicle when a tire thereon is underinflated and means responsive to the relative rotation of the wheels for preventing false indications of tire underinflation due to slipping of the wheels of the vehicle or to turning of the vehicle.

17 Claims, 3 Drawing Figures

PATENTED SEP 12 1972  3,691,524

INVENTORS
HAROLD A. FROST
MELVIN R. SIMPSON
BY Yount and Tarolli
ATTORNEYS

TIRE INFLATION MONITORING SYSTEM

The present invention relates to apparatus for sensing the diameter or rotation of a pair of wheels of a vehicle and means for rendering the apparatus ineffective to sense the difference in diameter of the wheels when the wheels are slipping relative to each other and means for preventing false indications of tire underinflation when the vehicle turns and the wheels on one side of the vehicle necessarily rotate faster than the wheels on the other side of the vehicle.

Tire inflation monitoring systems such as the ones disclosed in the Beatty et al. application, Ser. No. 676,981, now U.S. Pat. No. 3,581,277, and the Griffiths et al application, Ser. No. 867,046, now U.S. Pat. No. 3,613,075, both of which are assigned to the assignee of the present invention, disclose means for sensing and comparing the angular movement of a pair of wheels on a vehicle. The systems operate on the premise that if one of the tires of the vehicle becomes underinflated, it will rotate faster than the rest of the wheels of the vehicle as the diameter of the wheel will decrease while the surface speed will remain the same as the rest of the wheels. When the system senses a predetermined difference in the angular velocities of a tire, a signal is provided to an occupant of the vehicle to indicate that one of the tires of one of the wheels is underinflated.

Difficulties, however, may be encountered when one of the wheels slips relative to another of the wheels. The Griffiths et al application discloses means for cutting out the monitoring system at low speeds to prevent false signals of tire underinflation as caused by turning or slipping or a locked wheel. However, it is desirable to leave the monitoring system active at low speeds except when conditions would cause a false tire underinflation signal. This presents problems in that road conditions may cause slipping of the wheels at high speeds which would result in the Griffiths system initiating a false indication of an underinflated tire. The Beatty et al application discloses a tire inflation monitoring system in which the turning of the steering wheel or the application of the brakes completely cuts out the inflation monitoring system. It is desirable, however to have the monitoring system active when turning or braking except to the extent necessary to prevent false tire underinflation signals.

In accordance with the present invention the tire inflation monitoring system includes first means responsive to the angular movement of a pair of vehicle wheels for indicating an underinflated tire thereon, indicating means for signalling an occupant of the vehicle upon the occurrence of an underinflated tire on one of the wheels and means responsive to the relative rotational movement of the wheels for preventing false indications of tire underinflation due to slipping of a wheel relative to another wheel and for preventing false indications of tire underinflation.

Another object of the present invention is to provide a new and improved apparatus for providing a signal when a tire on a wheel of the vehicle is underinflated and means for rendering the system inoperative to produce a signal when one wheel of the vehicle is slipping relative to another wheel of the vehicle.

A further object of the present invention is to provide a new and improved tire monitoring system which is so constructed and arranged that false tire underinflation signals are prevented during turning for certain wheels while the system remains effective to signal underinflation for other wheels.

A still further object of the present invention is to provide a new and improved apparatus for providing a signal when a tire on a wheel of the vehicle is underinflated and including a counter associated with each wheel for counting the revolutions of its associated wheel with the counters for the rear wheels being reset once upon every revolution of one of the front wheels and the counters for the front wheels being reset once upon every revolution of one of the rear wheels and wherein the counters provide a signal to prevent false indication of an underinflated tire due to a slipping wheel, a locked skidding wheel or quick shifting between forward and reverse wherein one of the counters counts two revolutions of its associated wheel before being reset.

Another object of the present invention is to provide a new and improved apparatus for providing a signal when a tire on the wheel of a vehicle is underinflated and including a bi-directional counter for comparing the rotation of the two front wheels of the vehicle, a bi-directional counter for comparing the rotation of the two rear wheels of the vehicle, means for indicating the presence of an underinflated tire on the vehicle when one of the bi-directional counters senses that one of the wheels associated therewith is rotating at a speed which is at least a predetermined amount greater than the speed at which the other wheel associated therewith is rotating and means for preventing actuation of said alarm means when the bi-directional counters sense that both the wheels on one side of the vehicle are rotating at a speed which is at least a predetermined amount greater than the speed at which the wheels on the other side of the vehicle are rotating so as to prevent false indications of tire underinflation due to turning of the vehicle.

A still further object of the present invention is to provide a new and improved tire monitoring system in which the rotation of at least one of the drive wheels is compared to the rotation of at least one of the non-driving wheels to provide a slipping wheel cut out for the system which prevents false indications of tire underinflation due to a slipping wheel, a locked skidding wheel or quick shifting between forward and reverse.

Further objects and advantages of the present invention will become apparent from the following detailed description of a preferred embodiment thereof made with reference to the accompanying drawings forming a part of the present specification for all subject matter disclosed therein and in which.

Figure 1:
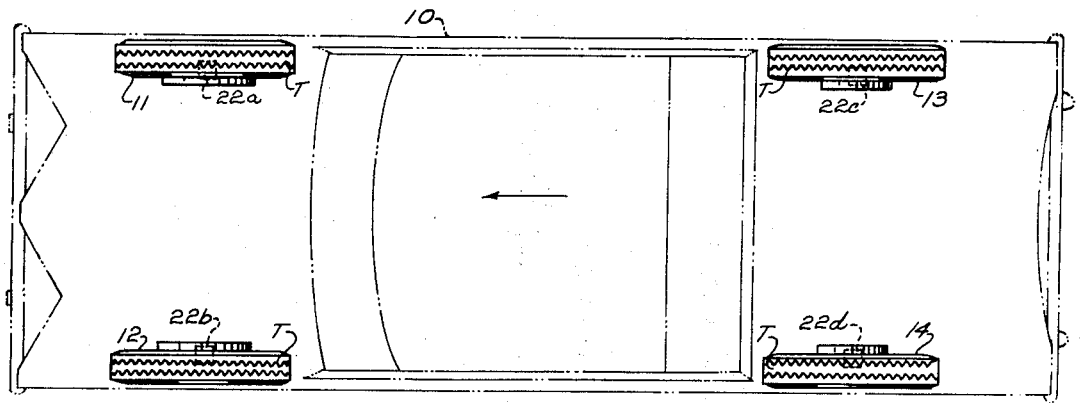
FIG. 1 is a diagrammatic showing of an automobile embodying the present invention.

In the preferred embodiment of the present invention illustrated in the drawings and described in the following specification, the presence of an underinflated tire on an automotive vehicle 10 is sensed by continuously monitoring the rotational velocities of the wheels of the automobile and indicating when one wheel of an automobile is rotating at a significantly different velocity than another wheel. In the illustrated embodiment, the angular movements of the front wheels 11 and 12 are compared with each other and the angular movements of the rear wheels 13 and 14 of the vehicle are compared with each other and a signal is given if the angular movement of the wheels of either pair differ sufficiently to indicate an underinflated tire.

Figure 2:
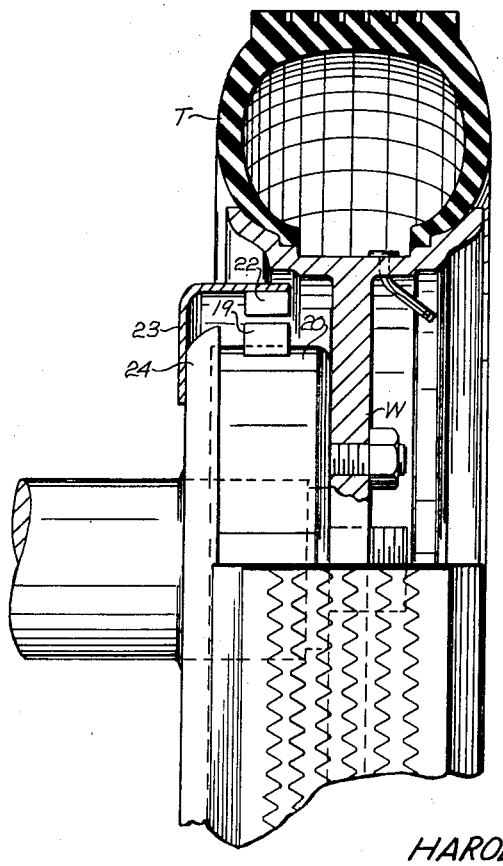
FIG. 2 is a cross-sectional view of a wheel with a revolution sensing device associated therewith.
Figure 3:
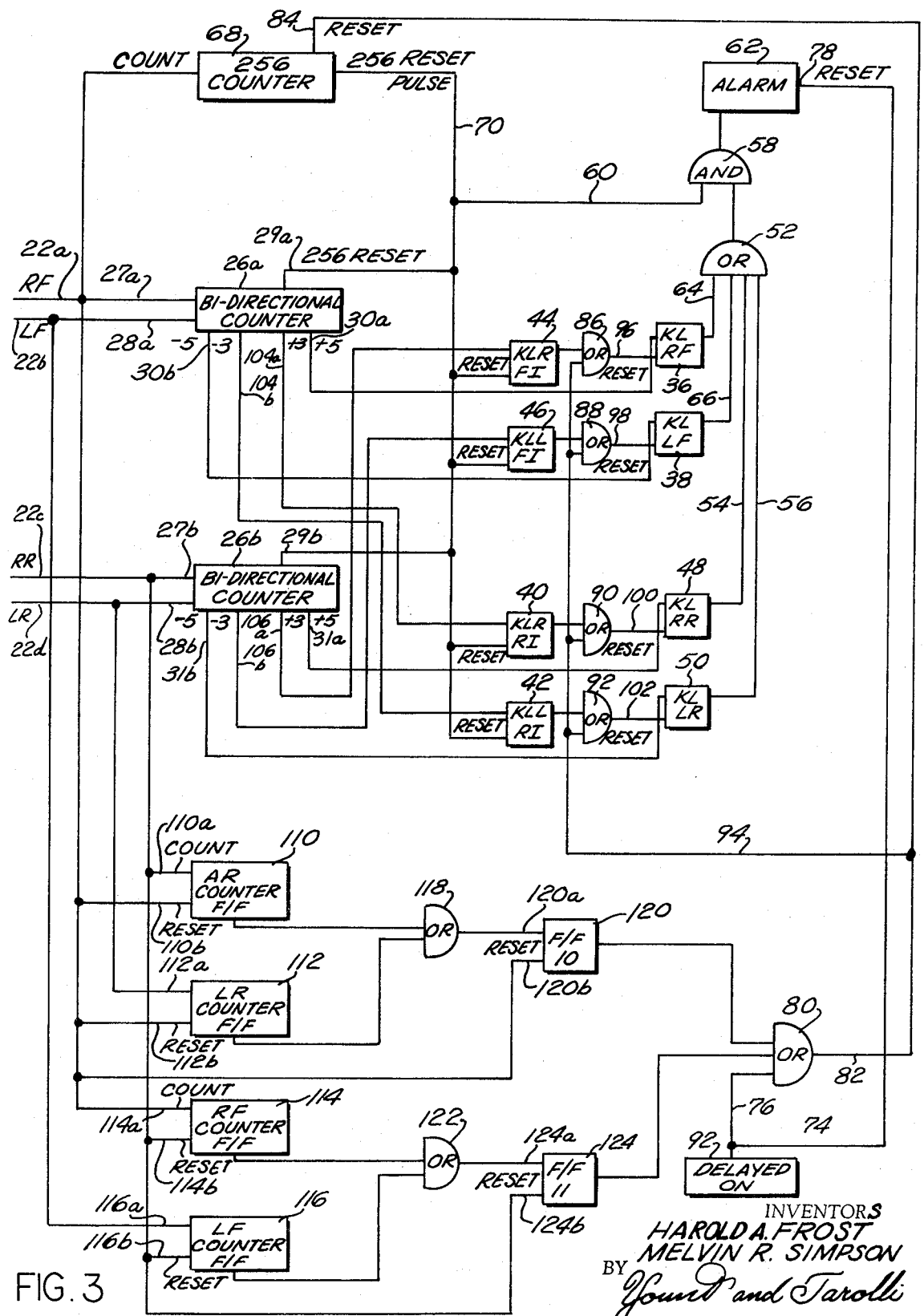
FIG. 3 is a diagrammatic view of the system for sensing an underinflated tire on the vehicle of FIG. 1.

The angular movement of each wheel is determined by counting the revolutions of the wheel. For this purpose, a block of metal 19 is mounted for rotation on a brake drum 20 of the wheel W as illustrated in FIG. 2. The block of metal 19 projects radially outwardly from the brake drum 20 and passes in close proximity to a pick-up 22 as the wheel rotates. The pick-up 22 may be a normally opened switch which is held closed by the attraction of a permanent magnet forming a part of the switch mechanism. The switch contacts are opened as the block 19 passes the switch to momentarily break an electrical circuit. The block 19 will pass the pickup 22 once for each revolution of the wheel W and thus the electrical circuit will be broken once during each revolution of the wheel. The electromagnetic pick-up 22 for each wheel may be mounted on a bracket 23 attached to the frame member 24 supporting the brake shoes which operate on the brake drum 20. The pick-ups for the front wheels 11 and 12 are designated 22a and 22b, respectively, while the pick-ups for the rear wheels 13 and 14 are designated 22c and 22d, respectively.

Pulses effected by the opening of the pick-ups 22a and 22b on the front wheels 11 and 12, respectively, are fed to a bi-directional counter 26a while pulses from the switches 22c and 22d on the rear wheels 13 and 14, respectively, are fed to a bi-directional counter 26b. The bi-directional counters 26a and 26b are well known to those skilled in the art and are adapted to add a count of one to the number in the counter when a pulse is applied to the add terminals 27a and 27b and to subtract a count of one when a pulse is applied to the subtract terminals 28a and 28b. The counters 26a and 26b may be preset to a certain count by applying a preset voltage to the terminals 29a and 29b of the counters 26a and 26b, respectively. Bi-directional counters are conventionally made up of a plurality of binary stages and each stage can be preset to either a one or a zero condition by applying a voltage to a particular terminal of the stage. Reset terminals 29a and 29b are connected to the terminals of each stage of the counters 26a and 26b, respectively, to set the stages to a one or a zero condition depending upon the number which is to be preset into the counters.

Output signals from the bi-directional counters may be derived when a predetermined number is registered in the counter. When a number exists in the counter, each stage of the counter has either a one or a zero condition depending upon the number and an output voltage or voltages are derived from each stage to indicate that the condition of that stage or stages are indicative of a predetermined number. In the illustrated embodiment, the counter 26a has its stages connected to the inputs of the flip-flops 36, 38, 40 and 42 while the bi-directional counter 26b has its stages connected to the flip-flops 44, 46, 48 and 50. Consequently, when a predetermined count exists in the bi-directional counters 26a or 26b, an input will be applied to one of the flip-flops associated with the bi-directional counter.

In the illustrated embodiment, the bidirectional counters 26a and 26b are normally set to zero at the start of a period in which it is desired to monitor the inflation of the tires on the vehicle 10. During normal operation, the number to which the counter will count will be either plus or minus one count as long as the number of pulses applied to the add and subtract terminals of the bi-directional counters are equal. This will be true as long as the pair of wheels supplying pulses to the counter are rotating at the same angular velocity. If a tire T becomes underinflated, the diameter of the wheel will decrease and the wheel will rotate at a greater angular velocity since it still must move at the same surface speed as the other wheels of the vehicle. If the tire T on the left rear wheel 14 becomes underinflated, the pulses which are applied to the subtract terminal 28b of the counter 26b will be greater in number than the pulses applied to the add terminal 27b. When the number of revolutions of the wheel 14 exceeds the revolution of the wheel 13 by five, in the illustrated embodiment, the count in the counter 26b will reach minus five and the terminal 31b will operate the flip-flop 50 which will indicate an underinflated tire on the vehicle. Similarly, if the tire T on the wheel 13 becomes underinflated while the tire 14 remains at its normal inflation the add pulses applied to terminal 27b will exceed the subtract pulses and when the count in the counter 26b increases to a plus five the terminal 31a will operate the flip flop 48. Operation of the flip-flop 48 when the count in the counter 26b reaches plus five causes a signal to be applied to the OR gate 52 through the line 54 and similarly operation of the flip-flop 50 when the count in the counter 26b reaches minus five causes a signal to be applied to the OR gate 52 through line 56. Operation of the OR gate 52 by flip-flops 48 or 50 sends a signal to the AND gate 58. The AND gate 58 will be operated when a signal is applied thereto from the OR gate 52 and from the line 60 as described hereinbelow to activate an alarm 62 to indicate to an occupant of the vehicle that a tire thereon is underinflated.

It should be apparent the operation of the bidirectional counter 26a which monitors the front wheels 11 and 12 of the vehicle is analogous to the operation of the bi-directional counter 26b which monitors the rear wheels 13 and 14 of the vehicle. The bi-directional counter 26a includes a pair of terminals 30a and 30b which corresponds respectively to plus five and minus five counts in the counter. The switch 22a associated with the right front wheel 11 is connected to the add terminal 27a of the counter 26a while the switch 22b associated with the left front wheel 12 is connected to the subtract terminal 28a of the counter 26a. When the difference in the number of rotations of the wheels 11 and 12 reaches plus or minus five, one of the terminals 30a or 30b will set the flip-flops 36 or 38 so as to initiate a signal indicative of an underinflated tire on the vehicle. Operation of flip-flop 36 applies a signal to the OR gate 52 via the line 64 and operation of the flip flop 38 applies a signal to the OR gate 52 via the line 66. Operation of the OR gate 52 by the flip-flops 36 or 38 sends a signal to the AND gate 58 which will actuate the alarm circuit 62 as described hereinbelow.

While in the given example, the underinflated signal is given when the number in the counter reaches a plus or minus five, such a signal could be derived for a first number in excess of a preset number of for a different number that is less than five by connecting the flip-flops 36, 38, 48 and 50 to different output terminals on their respective counters. It will therefore be understood that the excess number of counts required before the underinflated signal is given may be chosen to accommodate many variable factors, such as wheel size, etc.

During normal operations, the bidirectional counters 26a and 26b will operate to register in the counters the total difference in wheel revolutions for the wheels connected to the counter. When the car is traveling large distances, the difference in count produced by normal differences in wheel revolutions might cause the counters to falsely indicate an underinflated tire. It is desirable that the normal differences in wheel revolutions do not cause a false indication of an underinflated tire. Accordingly, the preferred embodiment includes means for periodically resetting the bi-directional counters 26a and 26b to zero to eliminate false indications of the underinflation due to normal differences in wheel revolutions which will compound over a period of time. The system thus provides a signal only when the counts necessary to obtain an underinflation signal are obtained within a predetermined time or distance interval.

In the illustrated embodiment, the bi-directional counters 26a and 26b are reset to their zero count as a function of distance. To this end a counter 68 is provided which has its input connected to the pickup for one of the wheels of the vehicle, the pickup 22a for the wheel 11 in the illustrated embodiment, to count the revolutions of the wheel. Each time the counter 68 fills to capacity an output signal is applied to a reset line 70 which applies a pulse to the AND gate 58 via the line 60 and to the reset terminals 29a and 29b of the bi-directional counters 26a and 26b respectively. The counter 68 is preferably a 256 cycle counter which will count 256 revolutions of the wheel 11 and then preferably reset the bidirectional counters 26a and 26b to zero. This will occur when the counter 68 reaches a zero count which is the next number it sequentially counts to after it reaches a count of 256 therein.

It should be apparent that to operate the AND gate 58 it is necessary to have pulses applied to both of the terminals of the AND gate 58. When pulses are applied to both of the terminals of the AND gate 58, the alarm 62 will be operated. One of the pulses applied to the AND gate 58 will come from the OR gate 52 and the other pulse will come from the reset line 60 associated with the counter 68. Therefore, it should be realized that the alarm circuit 62 may only be operated at the end of a period as counted by the counter 68. This is due to the fact that the counter 68 will only bias the AND gate 58 when an output pulse is applied along the line 70 associated with the counter 68. The alarm circuit will then indicate to an occupant of the vehicle that an underinflated tire is present on the vehicle.

The alarm circuit 62 is preferably reset only by turning off the ignition and once in a signal is given thereby the signal will be continuously given until the ignition of the vehicle 10 is turned off. The alarm 62 will then automatically reset to its nonactuated condition when the ignition is turned on again. Moreover, means are preferably provided for setting the counter 68, and the bidirectional counters 26a and 26b to their zero conditions and setting the alarm circuit 62 to its non-actuated condition when the ignition is turned on. This will prevent any false indications of tire underinflation that may be a result of the counters being set to a number to which the counter has counted during previous movement of the vehicle. To this end the delayed-on circuit 92 is provided which applies a signal through lines 74 and 76 when the ignition is turned on. The line 74 is connected to the reset terminal 78 of the alarm circuit 62 and when the ignition is turned on or off the alarm circuit 62 will be reset. The line 76 applies a signal to an OR gate 80 when the ignition is turned on and operation of the OR gate 80 applies a signal to the reset line 82 which is connected to the reset terminal 84 of the counter 68. Application of a signal on the reset line 82 resets counter 68 to its zero condition to thereby effect a signal on reset line 70 to thereby reset the bidirectional counters 26a and 26b as described herein above. When a signal is applied to line 70 the flip-flops 44, 46, 40 and 42 will also be reset as will be described more fully hereinbelow.

The line 82 is also connected to the OR gates 86, 88, 90 and 92 by the line 94. When a signal is applied to line 82 the OR gates 86, 88, 90 and 92 will be operated via line 94. The OR gates 86, 88, 90 and 92 are associated with the reset terminals 96, 98, 100 and 102 respectively of the bistable flip-flops 36, 38, 48 and 50 respectively and when the OR gates are operated the flip-flop associated therewith will be reset to their initial conditions.

It should be apparent that the bi-directional counters 26a and 26b will indicate the difference in revolutions of a wheel as compared to the other wheel on the opposite side of the car when the vehicle is turning. This is due to the fact that when the vehicle is turning the wheels on one side of the vehicle must necessarily rotate at a faster rate than the wheels on the other side of the vehicle. Therefore, means must be provided to prevent false indications of tire underinflation due to the relative rotation of the wheels which results upon turning of the vehicle. The means in the present invention which are responsive to the relative speed of the wheel include flip-flops 40 and 42 associated with the bi-directional counter 26a and flip-flop 44 and 46 associated with the bi-directional counter 26b.

The bidirectional counters 26a and 26b will both indicate a difference in the rotation of the wheels when the vehicle is turning. The terminals 104a and 104b of the bi-directional counter 26a are associated with the bistable flip-flops 40 and 42 respectively and when a signal is derived from either of the terminals 104a or 104b, which indicates a difference of plus or minus three revolutions respectively of the wheels 11 and 12, a signal will be applied to set and hold one of the flip-flops 40 or 42. The flip-flop 40 will be operated when a plus three count is reached in the counter 26a and flip-flop 42 will be operated when a minus three count is reached in the counter 26a. Operation of flip-flop 40 will apply a signal to operate OR gate 90 which will apply a pulse to the reset terminal of flip-flop 48 and operation of flip-flop 42 will apply a signal to operate OR gate 92 which will apply a reset signal to the reset terminal of flip-flop 50. Thus, if a plus or minus three is counted by counter 26a, flip-flops 40 or 42, respectively, will be set in a condition in which they will prevent flip-flops 48 or 50, respectively, from indicating an underinflated tire on the vehicle due to the relative rotation of the wheels due to turning of the vehicle.

The bi-directional counter 26b includes terminals 106a and 106b which apply a signal indicative of plus or minus three revolutions of the wheels 13 and 14, respectively, to the flip-flops 44 and 46 respectively to set and hold one of the flip-flops. When the counter 26b reaches a count of plus three the terminal 106a will apply a signal to the flip-flop 44 and the flip-flop 44 will operate OR gate 86 to thereby apply a reset signal to the reset terminal 96 of flip-flop 36 so as to reset flip-flop 36 if the flip-flop is not in a reset condition. When the counter 26b reaches a count of minus three the terminal 106b will apply a signal to the flip-flop 46 to cause the flip-flop 46 to operate OR gate 88. Operation of the OR gate 88 will apply a signal to the reset terminal 98 of flip-flop 38 to thereby reset flip-flop 38 if the flip-flop 38 is not in a reset condition so as to prevent flip-flop 38 from initiating a signal indicative of an underinflated tire.

When the bi-directional counter 26a counts to a plus or minus five it will apply a signal to either the flip-flop 36 or the flip-flop 38 respectively depending whether the count is plus or minus five. The flip-flop 36 or 38 when actuated will operate the OR gate 52 so as to apply a pulse to the AND gate 58 so that when the counter 68 fills and applies a pulse to the AND gate 58 the alarm circuit 62 will be operated. However, if the relative rotation of the wheels 11 and 12 which are associated with the counter 26a is due to turning of the vehicle then the wheels 13 and 14 will also rotate relative to each other. This will cause a pulse to be applied to one of the flip-flops 44 or 46 associated with the bi-directional counter 26b. The pulse will be applied when a plus or minus three is registered in the counter 26b. If a plus three is reached by the counter 26b flip-flop 44 will be set which, in turn, will effect a pulse being applied to the reset terminal 96 of the flip-flop 36 to insure that flip-flop 36 is in a condition which cannot operate the alarm circuit 62. If a minus three is sensed by counter 26b, it will effect a pulse being applied to the reset terminal 98 of the flip-flop 38 to insure that flip-flop 38 is in a condition in which it cannot operate the alarm. Because the alarm circuit 62 is only actuated when the counter 68 counts to the end of its period, the flip-flops 36, 38, 48 and 50 will only be operable to actuate the alarm circuit 62 at the end of a specific period counted by the counter 68. Therefore, if an operating signal is applied to one of the flip-flops 36, 38, 48 or 50 by one of the bidirectional counters 26a or 26b, the flip-flops must remain actuated until the counter 68 reaches the end of its period so as to be able to effect actuation of alarm 62. Thus, if the flip-flop 36, 38, 48 or 50 which has been actuated is reset by operation of one of the flip-flops 44, 46, 40 or 42 associated therewith prior to the end of the period counted by the counter 68 then a signal to effect actuation of the alarm 62 will be prevented. It should be obvious that if the vehicle is turning and the wheels thereon rotate relative to each other due to turning the described system will not actuate alarm 62 and, therefore, false indications of the underinflation will be prevented.

If the bi-directional counter 26b senses a difference in the relative rotation of the wheels 13 and 14 and applies a pulse to the flip-flops 48 or 50 via the output terminals 31a or 31b respectively to set the flip-flops 48 or 50, the OR gate 52 will be operated to apply an operating signal to the AND gate 58 associated with the alarm circuit 62. If, however, the vehicle is turning, then the bidirectional counter 26a will also apply a signal from the terminals 104a or 104b to set flip-flop 40 or 42 respectively which will then operate to insure that either flip-flop 48 or flip-flop 50 respectively is in its reset condition. This reset signal applied to the flip-flop 48 or 50 will prevent a signal from actuating the alarm circuit 62 in an analogous fashion to to the fashion in which the flip-flops 44 and 46 prevent actuation of the alarm circuit 62.

Therefore, it should be realized that if a difference of a predetermined magnitude in the relative rotation of either the front wheels or the rear wheels is sensed and at the same time a difference of a predetermined magnitude in the relative rotation of the rear wheels or front wheels, respectively, is sensed, the flip-flops 36, 38, 48 and 50 will be inhibited from actuating the alarm circuit 62. This condition will occur when the vehicle is turning and since the alarm circuit 62 is not set until the end of the 256 cycle count by the counter 68, the inhibit flip-flops 40, 42, 44 and 46 can be operated to block a false low tire indication any time during the 256 cycle counts if the flip-flops are operated. Thus, the present system prevents false indications of an underinflated tire when the vehicle is turning. This turning does not have to be a sharp 90° turn, such as the vehicle encounters when it is rounding a corner, but may be a much more gradual turn as when the vehicle goes around a traffic circle. This construction, of course, provides many advantages over the prior art constructions in that false indications of tire underinflation are prevented when the vehicle encounters a gradual turning situation where relative rotational movement of the wheels occurs.

It should be apparent that during turning of the vehicle and relative rotations of the wheels thereon the counts in the bi-directional counters 26a and 26b should both be approximately the same and the sign of the counts in both counters should be the same. If the vehicle is turning right, the left wheels will rotate faster than the right wheels and the counters 26a and 26b should both count negatively and, conversely, if the vehicle is turning left, the counters 26a and 26b should both count positively. This construction of the present system enables the system to sense the presence of an underinflated tire and actuate the alarm circuit even if the vehicle is turning. For example, if the vehicle is turning left, the right wheels will rotate faster than the left wheels and both of the counters 26a and 26b should count to plus five if the turn is of a substantial duration. The plus five counts in the counter 26a will actuate flip-flop 36 and the plus five counts in the counter 26b will actuate flip flop 48. However, since the counters 26a and 26b both counted to plus five the terminals 104a and 106a, respectively, thereof which correspond to plus three counts will also have been actuated to thereby operate flip-flops 40 and 44, respectively. This, of course, will reset the flip-flop 36 and 48 and a false indication of tire underinflation will be prevented.

If the vehicle is turning left and the left front wheel is underinflated then the left front wheel will also tend to rotate faster. This will cause more minus pulses to be applied to terminal 28a of counter 26a to thereby offset the now increased positive pulses applied by the right front wheel due to the turning of the vehicle. The increase in minus pulses caused by the underinflation of the left front wheel will prevent the counter 26a from counting to plus 3 and thus the flip-flop 40 will not be operated thereby. Thus, when the counter 26b counts to plus five due to the turning, the flip-flop 48 will be operated and a signal may be initiated to actuate the alarm circuit 62 when counter 68 fills. Thus, while the present system prevents false indications of tire underinflation due to turning of the vehicle, it is also operative to sense an underinflated tire during turning of the vehicle and effect actuation of the alarm circuit 62 in response thereto.

Means responsive to the relative speeds of the wheels are also provided to prevent false indications of tire underinflation due to the slipping of one wheel relative to another wheel. It should be apparent that if one wheel of the vehicle slips relative to another wheel the bi-directional counter with which it is associated will count difference in revolutions of the wheel and provide a signal which would be indicative of an underinflated tire on the vehicle. The means provided to prevent the false indications of underinflated tires due to slipping of one wheel of the vehicle relative to another wheel, includes the counters 110, 112, 114 and 116 which are associated with the pickups 22c for the right rear wheel 13, 22d for the left rear wheel 14, 22a for the right front wheel 11, and 22b for the left front wheel 12 respectively. The counters 110, 112, 114 and 116 include the input terminals 110a, 112a, 114a and 116a respectively, which apply a pulse to the counter each time the pickup associated with the counter opens which occurs once during each revolution of the wheel associated with the pick ups.

The right rear wheel counter 110 and the left rear wheel counter 112 are reset by actuation of the pickup 22a associated with the right front wheel and every time the right front wheel pickup 22a opens the counters will be reset to their zero condition by applying a pulse to the reset terminals 110b and 112b of the counters 110 and 112 respectively. The counters 114 and 116 associated with the right and left front wheels respectively are reset to their zero condition by applying a pulse to the reset terminals 114b and 116b of the counters 114 and 116, respectively, every time the right rear pickup 22c opens. While one pickup has been illustrated for resetting the rear wheel counters and one pickup utilized for resetting the front wheel counters, it should be appreciated that each of the front wheel and rear wheel counters could be reset by a separate pickup. This would result in a more complex, but more complete system being utilized.

The counters 110 and 112 associated with the rear wheels are operable to apply a signal to operate an OR gate 118 when either of the counters counts two pulses from the pickup 22c or the pickup 22d. The OR gate 118 is then operable to apply a pulse to an input terminal 120a of a flip-flop 120 to actuate the flip-flop 120. Operation of the flip-flop 120 will effect operation of the OR gate 80 which when operated will apply a resetting signal to the reset line 82. The counters 114 and 116 associated with the front wheels also have an OR gate 122 associated therewith and the counters 114 and 116 operate the OR gate 122 when either of the counters count two pulses from the pickup 22a or 22b associated therewith. Operation of the OR gate 122 applies a signal to the input 124a of the flip-flop 124 to thereby operate the flip-flop 124. The flip-flop 124 is connected to the OR gate 80 and will operate the OR gate 80 to apply a reset signal to reset line 82. Thus, it should be apparent that when either the flip-flop 120 or 124 is operated by any of the counters 110, 112, 114 or 116 reaching a count of plus two, the OR gate 80 will be operated to apply a reset signal to the reset line 82.

The reset line 82 is connected to a reset terminal 84 of the counter 68 and when a signal is applied on the reset line 82, the 256 cycle counter 68 will be reset to its zero condition, to thereby reset the bi-directional counters 26a and 26b to zero, as described hereinabove. The reset line 82 is also connected to the OR gates 86, 88, 90 and 92 which are associated with the reset terminals of the flip-flops 36, 38, 48 and 50, respectively, and application of a signal on the reset line 82 prevents flip-flops 36, 38, 48 and 50 from initiating a false signal of tire underinflation therefrom.

The counters 110, 112, 114 and 116 are reset to their zero condition when a pulse is applied to the terminals 110b, 112b, 114b and 116b, respectively. Since the counters 110 and 112 are reset by pulses from the switch 22a associated with the front wheel 11, it should be apparent that the counters 110 and 112 must count to two before the pickup 22a is opened to pulse the counters. In other words, if either of the rear wheels pulses the counters 110 or 112 twice before the front wheel 11 rotates once, the counters 110 and 112 will be operable to reset the entire system except for the alarm 62. The counters 114 and 116 are reset by a pulse being applied to the reset terminals 114b and 116b, respectively, from the switch 22c associated with the right rear wheel. The counters 114 and 116 are operated in an analogous fashion to the counters 110 and 112 and must count to plus two before the pickup 22c associated with the right rear wheel is opened in order for the counters to actuate the flip-flop 124 to reset the system.

It should be realized that if one of the wheels which reset the counter rotates more than one revolution while the wheel, the revolutions of which the counter is counting rotates less than approximately 95 percent of one revolution, depending on the length of the count pulse, then slipping of the wheel must necessarily occur. If, for example, a wheel is traveling twice as fast as another wheel of the vehicle when all the wheels are moving at an identical surface speed, the diameter of the one wheel which is traveling twice as fast must be half of the diameter of the other wheels. This drastic difference in diameter of the wheels of the vehicle does not occur due to underinflation of a tire. Therefore, when one wheel is rotating greater than one revolution while another wheel of the vehicle is rotating less than one revolution, a slipping of the one wheel may be the cause of the differences of speed. Therefore, if a slipping wheel is present on the vehicle the counters 110, 112, 114 and 116 will sense the presence of the slipping wheel and will effect application of a pulse to the reset line 82 to thereby reset the counter 68 to zero and apply pulses to the flip-flops 36, 38, 48 and 50 to prevent the false indication of an underinflated tire.

Flip-flops 120 and 124 have reset terminals 120b and 124b, respectively. The reset terminals 120b and 124b are associated with the pickups of 22a, associated with the right front wheel, and 22c, associated with the right rear wheel, respectively. It should be apparent that when a reset pulse is applied to the counters 110 and 112, the reset pulse will also be applied to the flip-flop 120 and when a reset pulse is applied to the counters 114 and 116, a reset pulse will be applied to the flip-flop 124. Thus, when the counters 110, 112, 114 and 116 are reset, the flip-flops 120 and 124 will also be reset to their initial conditions. Resetting of the flip-flops 120 and 124 will also follow if a single pickup is utilized, as discussed hereinabove, to reset each of the counters 110, 112, 114 and 116.

From the foregoing, it should be apparent that a new and improved tire inflation monitoring system has been provided. The system is operable to indicate to an occupant of the vehicle the presence of an underinflated tire. Moreover, the system includes means responsive to the relative speeds of the wheels for preventing a false indication of an underinflated tire due to relative rotational movement of the wheels when the vehicle is turning or when the wheels are slipping relative to each other.

While a particular system has been utilized to compare the angular movement of one wheel relative to another wheel, and to prevent false indications of tire underinflation, the invention contemplates the use of other systems. For example, the output of the bi-directional counters 26a and 26b could be fed into a third bi-directional counter which could operate the alarm upon reaching a certain count therein. The third bi-directional counter would not indicate an underinflated tire when the vehicle was turning because the counters 26a and 26b would feed approximately equal counts thereto during turning of the vehicle. This third counter would only operate to indicate an underinflated tire when a difference in signals from the counters 26a and 26b was received thereby. Moreover, other sensing means beside the pickups associated with each wheel could be used to sense the relative rotation of each wheel and the sensing means could compare the rotation of each wheel with a reference signal rather than with the rotation of the other wheels if it is so desired. Also, more or less than one count per revolution could be used to sense the revolution of the wheels as long as the number of counts for a single revolution if each of the wheels was the same. Furthermore, it should be apparent that diverse types of wheels could be utilized on a vehicle equipped with the present invention. In such a case at least one of the wheels would include an inflated tire thereon and the system would be operable to sense the inflation of the one wheel having the inflated tire thereon.

What we claim is:

1. A tire inflation monitoring system for a vehicle having a plurality of wheels which rotate in engagement with the supporting surface for the vehicle as the vehicle moves, said wheels including a first wheel having an inflated tire thereon and a second wheel which rotates relative to said first wheel when said tire is underinflated and also during a temporary operating condition for said vehicle which effects relative rotation of said first wheel and said second wheels when said tire is properly inflated, said wheels including a third wheel which rotates relative to one of the vehicle wheels during said temporary operating condition, first means responsive to angular rotation of said first and second wheels for signalling an underinflated tire on said first wheel, and second means responsive to the rotation of said third wheel relative to said one of said wheels for rendering said first means ineffective to render a signal indicating that said tire is underinflated during said temporary operating condition which effects relative rotation of said first and second wheels.

2. A tire inflation monitoring system as defined in claim 1 wherein said first and second wheels are drive wheels for said vehicle and said third wheel is a non-driving wheel, and said second means is responsive to differences in angular rotation of said third wheel relative to one of said first and second wheels.

3. A tire inflation monitoring system as defined in claim 1 wherein said one wheel is a fourth wheel with said second and fourth wheels being on one side of the vehicle and said first wheel and said third wheel being on the opposite side of said vehicle, said second means being responsive to differences in the angular rotation of said third wheel and said fourth wheel to render said first means ineffective during turning of said vehicle.

4. A tire inflation monitoring system as defined in claim 1 wherein said one wheel is a fourth wheel with said second and fourth wheels being on one side of the vehicle and said first and third wheels being on the opposite side of the vehicle, said second means being responsive to the relative rotation of said third and fourth wheels and being operable to render said first means ineffective to render a false signal indicative that said tire is underinflated when said third and fourth wheels are rotating relative to each other in the same manner as said first and second wheels are rotating relative to each other and said first and second wheels rotate relative to each other so that said first means senses a condition indicative of said tire being underinflated.

5. A tire inflation monitoring system for a vehicle having a plurality of wheels which engage and rotate on the supporting surface for the vehicle as the vehicle moves comprising signalling means for signalling an underinflated tire, first means responsive to the relative angular velocity of a first pair of said wheels for monitoring the inflation of a tire on one of the wheels and activating said signalling means in response to said first pair of wheels rotating relative to each other in a predetermined manner thereon, and second means responsive to the relative angular velocity of a different pair of said wheels on said vehicle for rendering said first means ineffective to activate said signalling means during a temporary vehicle operating condition under which said first means may operate to falsely indicate an under inflated tire.

6. In a vehicle having a plurality of wheels and an inflated tire on a wheel, a tire inflation monitoring system comprising first means responsive to angular movement of said wheels for sensing underinflation of said tire, indicating means responsive to said first means for signalling the presence of an underinflated tire and means responsive to the relative rotation of the wheels for preventing false indications of tire underinflation due to rotation of one of the wheels relative to another of the wheels.

7. In a vehicle a tire inflation monitoring system as defined in claim 6 wherein said means responsive to the relative rotation of the wheels includes means for preventing false indications of tire underinflation due to turning of the vehicle.

8. In a vehicle, a tire inflation monitoring system as defined in claim 7 wherein said means for preventing false indications of tire underinflation due to turning of the vehicle includes means responsive to the underinflation of said tire when the vehicle is turning which actuate said indicating means so as to signal the presence of an underinflated tire on the vehicle.

9. In a vehicle, a tire inflation monitoring system as defined in claim 6 wherein said means responsive to the relative rotation of said wheels includes means for preventing false indications of tire underinflation due to slipping of one wheel of the vehicle relative to another wheel of the vehicle.

10. In a vehicle, a tire inflation monitoring system as defined in claim 9 wherein said means responsive to the relative rotation of said wheels further includes means for preventing false indications of tire underinflation due to turning of the vehicle.

11. In a vehicle, a tire inflation monitoring system as defined in claim 7 wherein said first means includes a first and second bi-directional counter means each of which compares the speed at which a pair of the wheels on the vehicle rotate and which effect the actuation of said indicating means when the rate of rotation of one of the wheels of one of said pair of wheels is a predetermined amount greater than the other wheel of said one pair of wheels.

12. In a vehicle, a tire inflation monitoring system as defined in claim 11 wherein said means for preventing false indications of underinflation of said tire due to turning of the vehicle includes means for preventing said bi-directional counter means from effecting the actuation of said indicating means when one of each of said pair of wheels is rotating faster than the other of each of said pair of wheels due to turning of the vehicle and wherein said faster rotating wheels are necessarily located on the same side of the vehicle.

13. In a vehicle, a tire inflation monitoring system as defined in claim 9 wherein said means for preventing false indications of underinflation of said tire due to slipping of one wheel of the vehicle relative to another wheel of the vehicle includes a plurality of counter means one of which is associated with each of the wheels of the vehicle, each of said counter means being reset to an initial condition once for every rotation of a wheel of the vehicle which is other than the counters associated wheel, each of said counters being operable to count the revolutions of its associated wheel and effect a signal therefrom to prevent said indicating means from indicating underinflation of said tire if the counter's associated wheel rotates a predetermined number of revolutions before said counter is reset by one rotation of said other wheel to thereby indicate that said associated wheel is travelling a plurality of times faster than said other wheel which necessarily means said associated wheel is slipping.

14. A tire inflation monitoring system as defined in claim 5 wherein said second means comprises means responsive to the angular rotation of said different pair of wheels for activating said signalling means to indicate an underinflated tire on one of said different pair of wheels and said first means comprises means responsive to the relative angular velocity of said first pair of wheels for rendering said second means ineffective to activate said signalling means during predetermined operating conditions.

15. A tire inflation monitoring system as defined in claim 14 wherein said pairs of wheels comprise four wheels and said wheels each have a tire thereon to be monitored and said first and second means each comprise first and second control elements respectively activated when the angular velocities of the wheels of the respective pair have relative angular velocities in a respective direction to indicate tire underinflation and said first means being responsive to the direction of angular velocity of said first pair of wheels to render a respective one of said first and second elements of said second means ineffective to activate said signalling means for a respective direction of relative rotation of said different pair of wheels and said second means being comprised of means responsive to the direction of relative rotation of said different pair of wheels to render a respective one of said first and second elements of said first means ineffective to activate said signalling means for a respective direction of angular rotation of said first pair of wheels.

16. A tire inflation monitoring system as defined in claim 15 wherein said first and second means each comprise a bi-directional counter having plus and minus input terminals for counting in respective directions and a respective pulse generator for each wheel for supplying pulses to a respective one of said plus and minus terminals, said counters each having first and second count outputs for plus and minus counts from a predetermined reference count connected to activate respective ones of said first and second control elements of the other of said first and second means and second and third count outputs for indicating plus and minus counts respectively which are higher than the counts said first and second count outputs for activating respective ones of said first and second control elements of the corresponding one of said first and second means.

17. In a tire inflation monitoring system as defined in claim 5 wherein said second means comprises means responsive to a predetermined difference in rotation between said different pair of said wheels to render said first means ineffective to activate said signalling means in response to relative rotation of said first pair of wheels in said predetermined manner.

* * * * *